(12) United States Patent
Lee et al.

(10) Patent No.: US 11,709,880 B2
(45) Date of Patent: Jul. 25, 2023

(54) METHOD OF IMAGE SEARCHING BASED ON ARTIFICIAL INTELLIGENCE AND APPARATUS FOR PERFORMING THE SAME

(71) Applicant: Electronics and Telecommunications Research Institute, Daejeon (KR)

(72) Inventors: Mun Young Lee, Seoul (KR); Mi Gyeong Yang, Seoul (KR); Seung Hun Jeong, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 241 days.

(21) Appl. No.: 17/162,370

(22) Filed: Jan. 29, 2021

(65) Prior Publication Data
US 2021/0240758 A1    Aug. 5, 2021

(30) Foreign Application Priority Data
Jan. 30, 2020 (KR) .......................... 10-2020-0010923

(51) Int. Cl.
| | |
|---|---|
| G06F 16/583 | (2019.01) |
| G06F 16/532 | (2019.01) |
| G06F 16/54 | (2019.01) |
| G06F 40/205 | (2020.01) |
| G06F 16/538 | (2019.01) |

(52) U.S. Cl.
CPC .......... *G06F 16/532* (2019.01); *G06F 16/538* (2019.01); *G06F 16/54* (2019.01); *G06F 16/583* (2019.01); *G06F 40/205* (2020.01)

(58) Field of Classification Search
CPC ...................................................... G06F 16/583
USPC ........................................................ 707/769
See application file for complete search history.

(56) References Cited

U.S. PATENT DOCUMENTS

| | | | | |
|---|---|---|---|---|
| 8,788,518 | B2 * | 7/2014 | Carpenter ............. | G06F 3/0482 |
| | | | | 707/769 |
| 10,296,538 | B2 * | 5/2019 | Jiang ..................... | G06F 16/951 |
| 10,579,902 | B2 | 3/2020 | Lim | |
| 2002/0081024 | A1 | 6/2002 | Park et al. | |
| 2011/0142336 | A1 | 6/2011 | Lee et al. | |

(Continued)

FOREIGN PATENT DOCUMENTS

| | | |
|---|---|---|
| KR | 10-2018-0072534 | 6/2018 |
| KR | 10-2018-0113306 | 10/2018 |
| WO | 2010/005751 | 1/2010 |

*Primary Examiner* — Kimberly L Wilson
(74) *Attorney, Agent, or Firm* — Kile Park Reed & Houtteman PLLC

(57) ABSTRACT

Provided is a method of image searching based on artificial intelligence (AI), the method including acquiring retrieved information, which includes at least one of a retrieved image and an image address, and a user query on the basis of a search result of an image search engine, detecting a keyword-category combination on the basis of a type of the acquired user query, determining whether cache data that matches the detected keyword-category combination exists, generating, in response to absence of the cache data that matches the keyword-category combination, an object-category combination through an AI technology based object detection on the acquired retrieved information.

16 Claims, 9 Drawing Sheets

(56) References Cited

U.S. PATENT DOCUMENTS

2016/0062903 A1\* 3/2016 Gao .................. G06F 12/0808
 711/133
2016/0373397 A1\* 12/2016 Kesten .................. H04L 67/53
2017/0255681 A1\* 9/2017 Giunio-Zorkin .... G06F 16/9574

\* cited by examiner

METHOD OF IMAGE SEARCHING BASED ON ARTIFICIAL INTELLIGENCE AND APPARATUS FOR PERFORMING THE SAME

CROSS-REFERENCE TO RELATED APPLICATION

This application claims priority to and the benefit of Korean Patent Application No. 10-2020-0010923, filed on Jan. 30, 2020, the disclosure of which is incorporated herein by reference in its entirety.

BACKGROUND

1. Field of the Invention

The present invention relates to a method of image searching and an apparatus for performing the same, and more specifically, to a method of image searching using an artificial intelligence (AI) technology and a search engine, and an apparatus for performing the same.

2. Discussion of Related Art

In order to search for an image desired by a user in an existing search engine, an indexing method of matching a user query with text information attached to an image is widely used. However, such a text-based image search technology may have low accuracy in a search result when the text describing the image is wrong.

In addition, since the text-based image search technology is based on an index corresponding to a category code attached to an image, a bias may occur in the search result depending on the number of labeled images for each query. In addition, since the conventional text-based image search technology mainly uses word-based matching, retrieved image that is not related to what a user desires to search for may be provided as a search result when text attached to the retrieved image is related to the user query.

In order to solve such a problem, the conventional text-based image searching uses modified ranking algorithms based on an optimal ranking signal to match a text-based query retrieved by a user with a file name or a nearby word of a retrieved image even when a key word extracted from the retrieved text-based query does not accurately match with the file name or the nearby word of the retrieved image.

However, in the case of self-development of ranking signal technology for search engines, a large volume of resources is required in terms of time and cost, and in the case of using search engines provided by other companies, there is a difficulty in customization for application and interoperation because related core technologies are often not disclosed. In addition, since the ranking algorithm is applied after execution of matching, when a mistake occurs in an operation of matching, the final research may be limited even when the ranking algorithm is excellent. In addition, even when the technology for matching image-related information with a user query is excellent, an error in text describing the image itself may lead to degradation of the performance of the image search result.

SUMMARY OF THE INVENTION

The present invention provides a method of image searching based on artificial intelligence (AI), in which when performing an image search on the basis of a user query while a search engine performs a search on a query requested by a user, a natural language processing analysis result and an object detection analysis result from a search query of a user using AI technology is compared with an object detection result on result search images collected by the search engine, and the user is finally provided with only the matched search result and an apparatus for performing the same.

The present invention also provides a method of image searching based on artificial intelligence (AI), in which, in order to show an accurate image search result desired by a user, natural language processing and object recognition based on AI are used on the basis of the existing search engine so that an image desired by a user is retrieved with high accuracy and provided, and an apparatus for performing the same.

The technical objectives of the present invention are not limited to the above, and other objectives may become apparent to those of ordinary skill in the art based on the following description.

According to one aspect of the present invention, there is provided a method of image searching based on artificial intelligence (AI), the method including: acquiring retrieved information, which includes at least one of a retrieved image and an image address, and a user query on the basis of a search result of an image search engine; detecting a keyword-category combination on the basis of a type of the acquired user query; determining whether cache data that matches the detected keyword-category combination exists; generating, in response to absence of the cache data that matches the keyword-category combination, an object-category combination through an AI technology-based object detection on the acquired retrieved information; performing matching between the acquired keyword-category combination and the object-category combination to, when the acquired keyword-category combination and the object-category combination match each other, display an image from which the object-category combination is detected; and mapping and storing the keyword-category combination and the retrieved information as new cache data, wherein the AI technology includes at least one of a natural language processing technology and an image object recognition technology.

The detecting of the keyword-category combination may include, when the type of the acquired user inquiry is a text-based inquiry: determining whether a keyword detected by applying the natural language processing technology to the text-based query is included in object detection target category information defined in advance; and in response to the detected keyword being included in the object detection target category information, detecting the keyword-category combination for the keyword from a keyword-category combination set that is generated in a form of a data structure of a combination of an object-category corresponding to candidate keywords including the keyword and direction information including information about a location and direction of an object.

The detecting of the keyword-category combination may include, when the type of the acquired user inquiry is a speech-based inquiry: determining whether a keyword detected by applying the natural language processing technology to a speech recognition execution result from the speech-based query is included in object detection target category information defined in advance; and in response to the detected keyword being included in the object detection target category information, detecting the keyword-category combination for the keyword from a keyword-category combination set that is generated in a form of a data structure of a combination of an object-category corresponding to candidate keywords including the keyword and direction information including information about a location and direction of an object.

The natural language processing technology may include at least one of morpheme analysis, named entity recognition, and question analysis.

The morpheme analysis may analyze whether a morpheme detected from the acquired user query belongs to the object detection target category information and whether the morpheme belongs to the direction information in the keyword-category combination set.

The named entity recognition may detect a named entity from the detected morpheme and check whether the detected named entity is included in the object-category.

The question analysis may, for the morpheme which is detected through the morpheme analysis and the named object recognition but does not belong to the object detection target category, analyze the user query to understand the meaning of the user query and structure the user query to determine whether the morpheme belongs to the object detection target category.

The detecting of the keyword-category combination may include, when the type of the acquired user inquiry is an image-based inquiry, generating an object-category combination for the detected retrieved image through an image object detection process.

The object-category combination may be a combination of an object-category regarding at least one object in the retrieved image detected through the image object detection process and belonging to object detection target category information and direction information including information about a location and direction between objects in the detected retrieved image.

The determining of whether the cache data exists may include: performing matching between the keyword-category combination generated on the user query and pieces of keyword-category combination data regarding request processing contents collected and stored in advance, detecting the cache data corresponding to the keyword-category combination data that matches the keyword-category combination, accessing an image address mapped to the cache data to acquire an image, and displaying the acquired image.

The generating of the object-category combination may include performing object detection on a retrieved image found in the search result of the image search engine, generating the object-category combination using an object-category belonging to the object detection target category information, and storing the generated object-category combination in a form of a specific data structure.

The specific data structure may include a data structure corresponding to at least one of a linear data structure and a nonlinear data structure.

The object-category combination may be a combination of an object-category of an object detected through the object detection on the image retrieved by the image search engine and direction information including a location and direction of the object of the retrieved image identified in the retrieved image.

According to another aspect of the present invention, there is provided an apparatus for image searching based on artificial intelligence (AI), the apparatus including: a data collection unit configured to acquire retrieved information including at least one of a retrieved image and an image address and a user query on the basis of a search result of an image search engine; a query keyword detection unit configured to detect a keyword-category combination on the basis of a type of the acquired user query; a cache data matching unit configured to determine whether cache data that matches the detected keyword-category combination exists; an image object detection unit configured to generate, in response to absence of the cache data that matches the keyword-category combination, an object-category combination through an AI technology-based object detection on the acquired retrieved information; and an element matching and storage unit configured to, when the acquired keyword-category combination and the object-category combination match each other in units of combination elements as a result of combination element matching performed between the acquired keyword-category combination and the object-category combination, display the retrieved image from which the object-category combination is detected, and map and store the keyword-category combination and the image address of the retrieved image as new cache data.

The AI technology may include at least one of a natural language processing technology that includes at least one of morpheme analysis, named entity recognition, and question analysis, and an image object recognition technology.

The query keyword detection may be configured to: when the type of the acquired user inquiry is a text-based inquiry, apply the natural language processing technology to the text-based user query to detect the keyword-category combination; when the type of the acquired user inquiry is a speech-based inquiry, apply the natural language processing technology to a result obtained by performing speech recognition on the speech-based query to detect the keyword-category combination; and when the type of the acquired user inquiry is an image-based inquiry, detect the object-category combination including an object in the retrieved image and direction information including information about a location and direction of the object in the retrieved image identified in the retrieved image through an image object detection process, and wherein the keyword-category combination may be a combination of an object-category included in object detection target category information to which a keyword detected from the user query belongs and direction information including information about a location and direction of an object.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
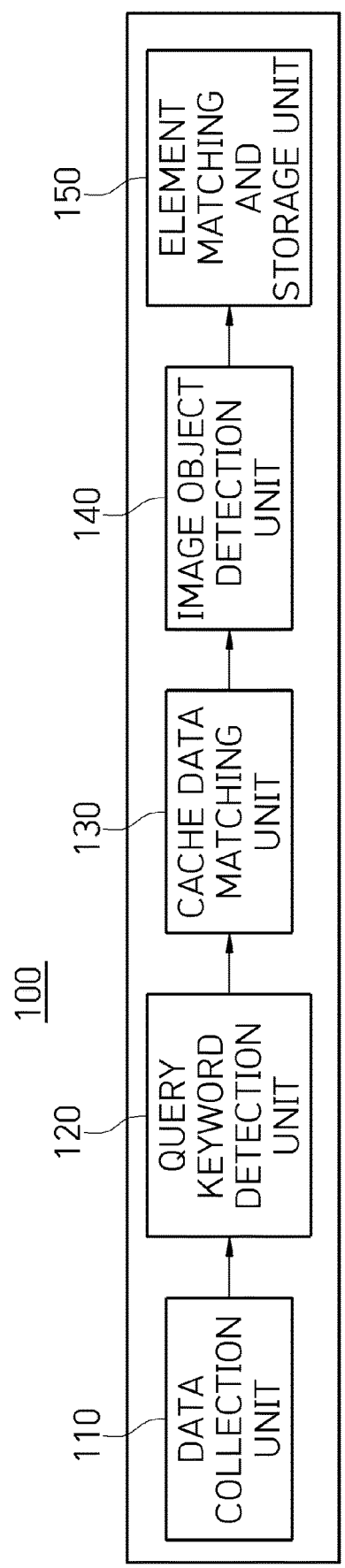
FIG. 1 is a block diagram illustrating an apparatus for image searching based on artificial intelligence (AI) according to an embodiment of the present invention.

While the present invention is susceptible to various modifications and alternative embodiments, specific embodiments thereof are shown by way of example in the accompanying drawings and will be described. However, it should be understood that there is no intention to limit the present invention to the particular embodiments disclosed, but on the contrary, the present invention is to cover all modifications, equivalents, and alternatives falling within the spirit and scope of the present invention.

It will be understood that, although the terms first, second, etc. may be used herein to describe various elements, the elements should not be limited by the terms. The terms are only used to distinguish one element from another. For example, a first element could be termed a second element, and, similarly, a second element could be termed a first element without departing from the scope of the present invention. As used herein, the term "and/or" includes any one or combination of a plurality of the associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

The terminology used herein is for the purpose of describing particular embodiments only and is not intended to be limiting to the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components but do not preclude the presence or addition of one or more other features, integers, steps, operations, elements, components, and/or groups thereof.

Term "the aforementioned" and similar designations used in the present invention may indicate both singular and plural. In addition, unless clearly specified otherwise, the operations describing the method according to the present disclosure may be performed in an order to carry out the desired purpose. The present invention is not limited according to the described order of the operations.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described with reference to the accompanying drawings in detail. For better understanding of the present invention, the same reference numerals are used to refer to the same elements through the description of the figures, and the description of the same elements will be omitted.

FIG. 1 is a block diagram illustrating an apparatus for image searching based on artificial intelligence (AI) according to an embodiment of the present invention.

An apparatus 100 for image searching based on AI, which is combined with a search engine, according to an embodiment of the present invention includes a data collection unit 110 configured to acquire a user query and retrieved information including a retrieved image and an image address with respect to an image search engine search result and configured to perform pre-processing including image address sorting, a query keyword detection unit 120 operating based on AI and configured to acquire a keyword-category combination from the acquired user query, a cache data matching unit 130 configured to check whether the acquired keyword-category combination is stored in a cache, an image object detection unit 140 configured to detect an object in a retrieved image collected on the basis of artificial intelligence, and an element matching and storage unit 150 configured to perform matching between the acquired keyword-category combination and an image object-category combination and store a result of the matching in a cache.

Referring to FIG. 1, the apparatus 100 for image searching based on AI according to the embodiment of the present invention is characterized in acquiring a user query and retrieved information regarding a search on the basis of search results of the existing image search engine, detecting a keyword-category combination according to the type of the acquired query to check whether previous search results are available for use and to detect an image object using AI according to the result of checking, determining whether the detected keyword-category combination matches object-category combination data, and displaying a matched retrieved image on a display as a final result.

In this case, since the apparatus 100 for image searching based on AI according to the embodiment of the present invention operates based on the existing image search engine, the apparatus 100 for image searching based on AI performs a process of comparing a natural language processing technology application result and an object detection analysis result from a user query with an object detection result on a retrieved image collected by the image search engine.

Next, each component of the apparatus 100 for image searching based on AI according to the embodiment of the present invention will be described in detail.

In the present invention, a user query refers to a request made by a client to a server that specific information be shown and processing thereof, and the user query is generally used to search for a specific subject word, phrase, image, etc. from a database of a server such that a subject term desired to be retrieved is input into a search field of a search engine, and content of the input is delivered to the server.

The search engine may search in a database thereof or may move to each web page targeted for searching or to representative pages of all websites and perform a search. Searching on an website refers to accessing the web page and searching for a search target using a program referred to as a spider (also referred to as a crawler or bot) that uses hypertext links on each page and reads other pages of the website, a program that generates a huge index (also known as a catalog) for the read web page, and a program that accepts a user's search request, compares the request with content in the index, and returns a search result (another method of using a search engine is to search for a directory having a subject-specific structure, and a number of web portal sites may also provide a directory method along with a search engine to search for information related to queries.)

On the other hand, not only a user query in the form of text but also a user query requesting a form of an image may be searched for. Basically, a method of searching for an image through a search engine is performed by a matching operation of selecting all the images related to a picture or drawing associated with an image requested by a user from a text-based user query, a feature extraction operation for the matched images, and a ranking operation of ranking the matched images on the basis of the extracted features. In the matching operation, pattern recognition that considers the color, overall shape, and layout of the image is used for the matching.

Since the conventional text-based image search technology applies the ranking algorithm after execution of matching, when a mistake occurs from the matching operation, the search result may be limited even when the ranking algorithm is excellent. In order to solve such a problem, the apparatus 100 for image searching based on AI according to the embodiment of the present invention of FIG. 1 combines the existing image search engine with AI technology. The AI technology in the apparatus for image searching based on AI according to the embodiment of the present invention of FIG. 1 includes a natural language processing technology that extracts keywords from user queries and an intra-image object recognition technology that detects what kind of person or object exists in the image, and further, detects what kind of layout of the person or object has.

Figure 2:
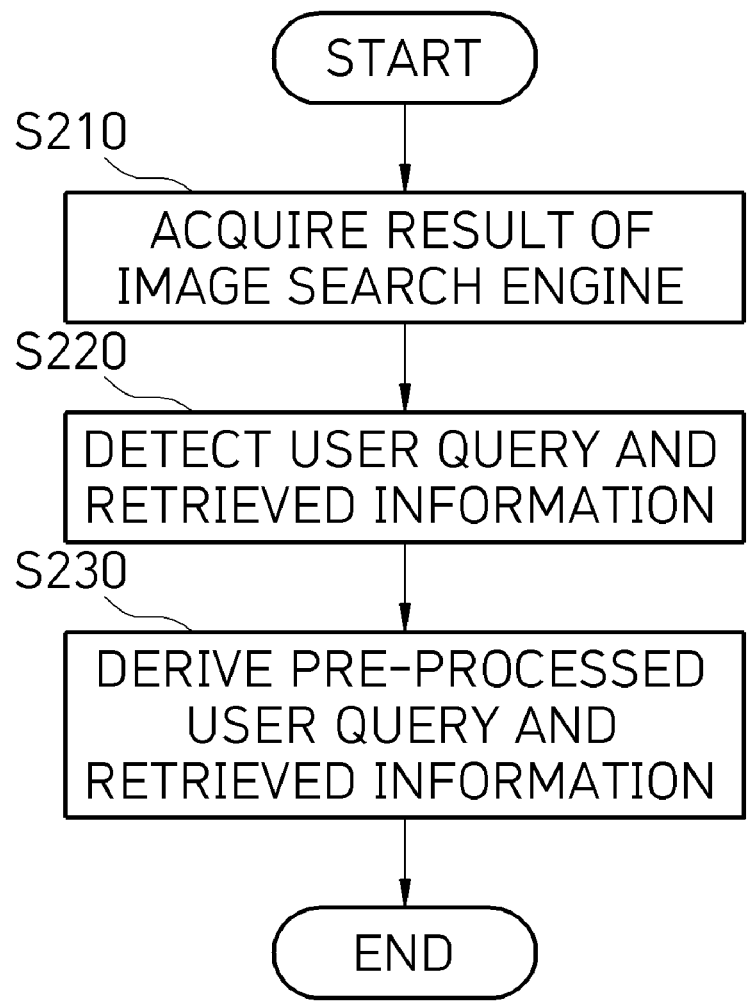
FIG. 2 is a flowchart illustrating operations performed by a data collection unit of an apparatus for image searching based on AI according to an embodiment of the present invention.

Referring to FIG. 2, the data collection unit 110 of the apparatus 100 for image searching based on AI according to the embodiment of the present invention acquires a search result of an image search engine (S210), detects a user query and retrieved information including a retrieved image and an image address thereof (stored website path address, etc.) on the basis of the acquired search result (S220), and performs pre-processing on the detected query and image address using image rank information of the search engine (for example, image address sorting, etc.) to derive pre-processed user query and retrieved information for the retrieved image (S230).

The query keyword detection unit 120 of the apparatus 100 for image searching based on AI according to the embodiment of the present invention detects a keyword-category combination corresponding to an image category of the retrieved image on the basis of the user query acquired by the data collection unit 110 and pre-constructed object detection target category information. In this case, the query keyword detection unit 120 performs different keyword detection processes according to the type of query acquired by the data collection unit 110.

The keyword-category combination refers to a group of results (defined as keywords) obtained by performing natural language processing analysis on natural language text, which are category names corresponding to pre-defined object detection target category information. For example, the pre-defined object detection target category information may refer to a category of a higher concept, such as "dog", "cat", and "vehicle", or a category of a lower concept, such as "chihuahua", "Jindo dog", "Angola", "Russian blue", "Cadillac", and "Porsche" (but the present invention is not limited thereto and may include all upper and lower concepts or may be defined as a more subdivided category).

Figure 3:
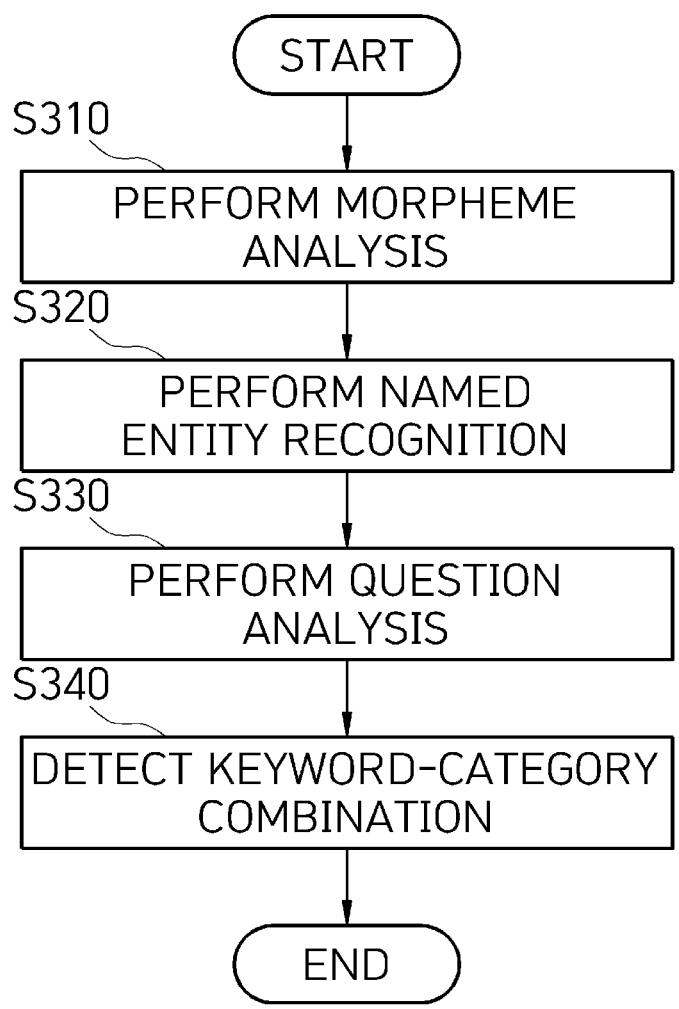
FIG. 3 is a flowchart illustrating operations performed by a text query keyword detection unit of an apparatus for image searching based on AI according to an embodiment of the present invention.

Referring to FIG. 3, when the acquired user query is a text-based query, a keyword-category combination is detected using AI natural language processing technology. Specifically, the input text query is subject to natural language processing technology, such as morpheme analysis (part of speech tagging) (S310), named entity recognition (NER) (S320), and question analysis (S330) on the basis of object detection target category information.

The morpheme analysis process detects a morpheme from the user query received as an input and analyzes whether the detected morpheme matches a name of an object-category in the pre-defined object detection target category information and whether the detected morpheme belongs to a noun indicating the location and direction (in other words, the morpheme analysis is a process of representing a word as text corresponding to a specific part of a specific word according to the definition and context of the word and derives adjacent words and a relationship between related words in a phrase, a sentence, or a paragraph and assigns a tag to each morpheme).

The named entity recognition process detects a named entity from the detected morpheme and checks whether the named entity is included in the object detection target category information, and the question analysis process is a process in which a morpheme (referred to as unclassified object-category) that is detected through the two operations (the morpheme analysis process and the named entity recognition process) but does not belong to the object detection target category information is subject to question analysis (analyzing natural language corresponding to a question to understand the meaning of the question and structuring the question to analyze the intention of the question) to analyze whether the question belongs to an object-category.

With respect to a result obtained after performing the above described three processes, a keyword-category combination, in which an object-category belonging to the object detection target category information and direction information including information about the location and direction of an object is detected from the user query, is stored in the form of a linear and/or nonlinear data structure, such as a stack, a queue, and a binary tree (S340).

Figure 4:
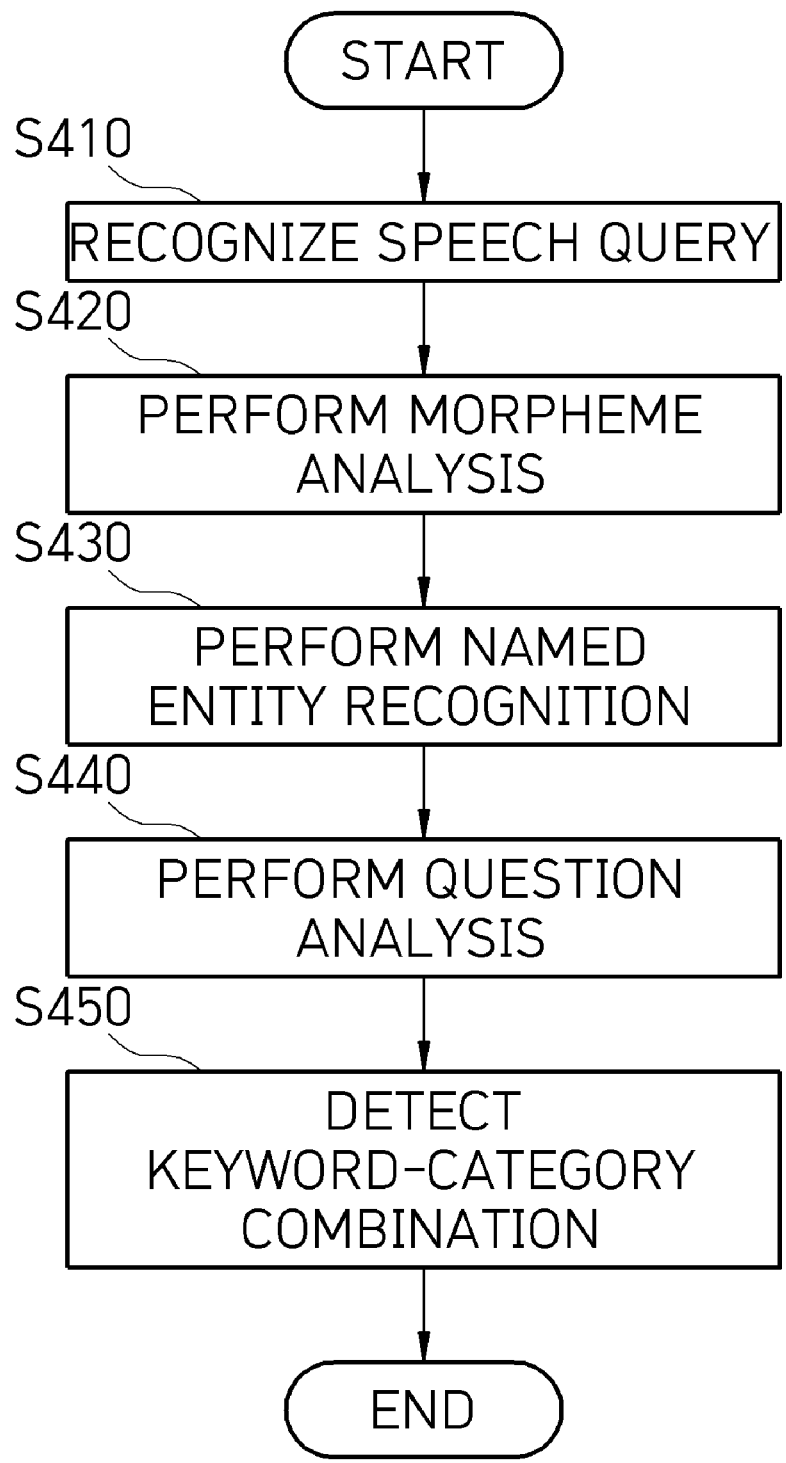
FIG. 4 is a flowchart illustrating operations performed by a speech query keyword detection unit of an apparatus for image searching based on AI according to an embodiment of the present invention.

Referring to FIG. 4, similarly, when the user query acquired by the data collection unit 110 is a speech-based query, a keyword-category combination is detected through the speech recognition process and the above-described AI natural language processing technology on the speech query. In detail, in the speech recognition process, the acquired speech query is subject to speech recognition (S410) through a speech recognizer (not shown), etc., and the result of the speech recognition is subject to morpheme analysis (S420), named entity recognition (S430), and question analysis (S440) on the basis of the above-described object detection target category information.

With respect to a result obtained after performing the above described three processes, a keyword-category combination, in which an object-category belonging to the object detection target category information and direction information including information about the location and direction of the object is detected from the user query, is stored in the form of a linear and/or nonlinear data structure, such as a stack, a queue, and a binary tree (S450).

Figure 5:
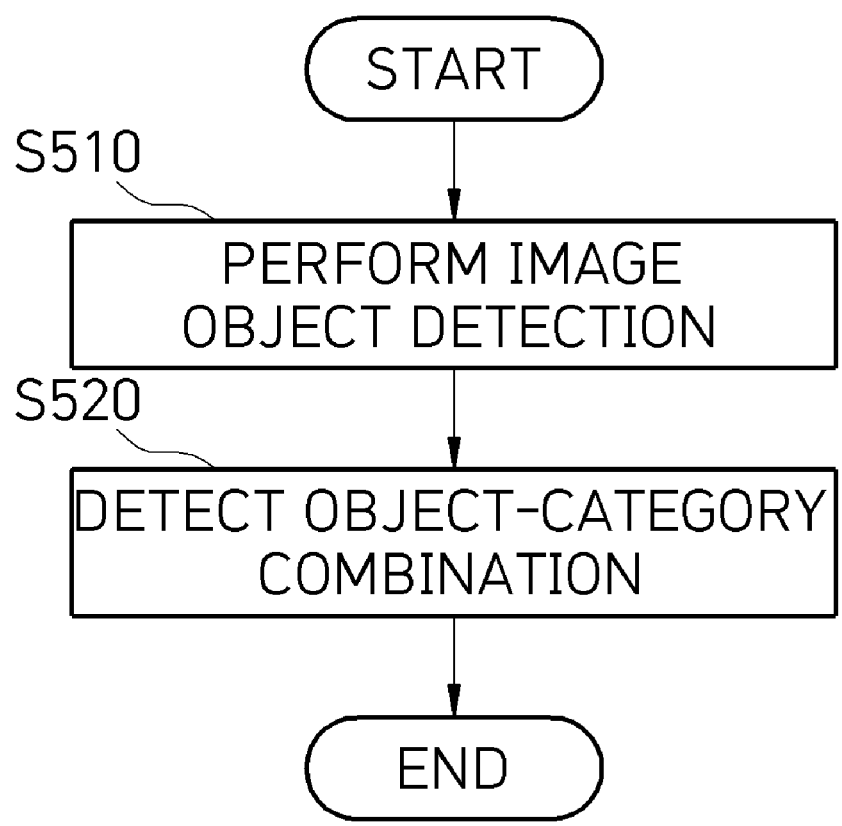
FIG. 5 is a flowchart illustrating operations performed by an image query keyword detection unit of an apparatus for image searching based on AI according to an embodiment of the present invention.

On the other hand, referring to FIG. 5, when the user query acquired by the data collection unit 110 is an image-based query, the input image-based query is subjected to image object detection on the basis of the above-described object detection target category information to detect objects in the retrieved image and the locational relationship between the objects (S510). Subsequently, an object-category combination, in which an object-category name belonging to the object detection target category information and direction information including information about the location and direction of the object is detected from the user query, is stored in the form of a linear and/or nonlinear data structure, such as a stack, a queue, and a binary tree (S520).

Figure 6:
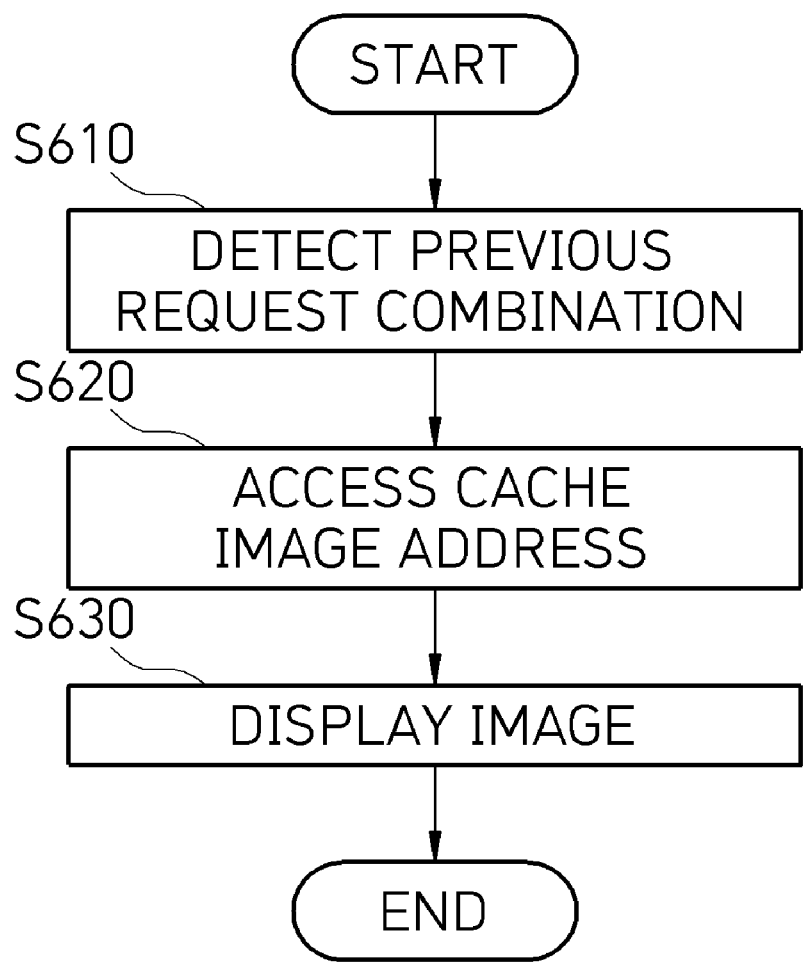
FIG. 6 is a flowchart illustrating operations performed by a cache data matching unit of an apparatus for image searching based on AI according to an embodiment of the present invention.

The cache data matching unit 130 of the apparatus 100 for image searching based on AI according to the embodiment of the present invention checks whether the keyword-category combination detected by the query keyword detection unit 120 is already stored in a cache and, when the keyword-category combination is already stored, uses previous request processing content to thereby save the processing time for image search. Specifically, referring to FIG. 6, the cache data matching unit 130 performs matching between a keyword-category combination, which is obtained through a query natural language processing unit (a module that performs natural language processing of AI technology on a query) on pieces of keyword-category combination data detected by the query keyword detection unit 120, and cache data corresponding to the previous request processing content collected and stored by a cache data storage of the cache data matching unit 130 to detect query cache data that is determined as being matched (S610), accesses an image address that is mapped to the matched cache data (S620) to acquire an image, and displays the acquired image (S630).

In response to existence of query cache data matched through such a process, the image search process is terminated by the execution of the process in the cache data matching unit 130, and in response to absence of the matched query cache data, the image object detection unit 140, which will be described below, performs an image object detection operation.

Figure 7:
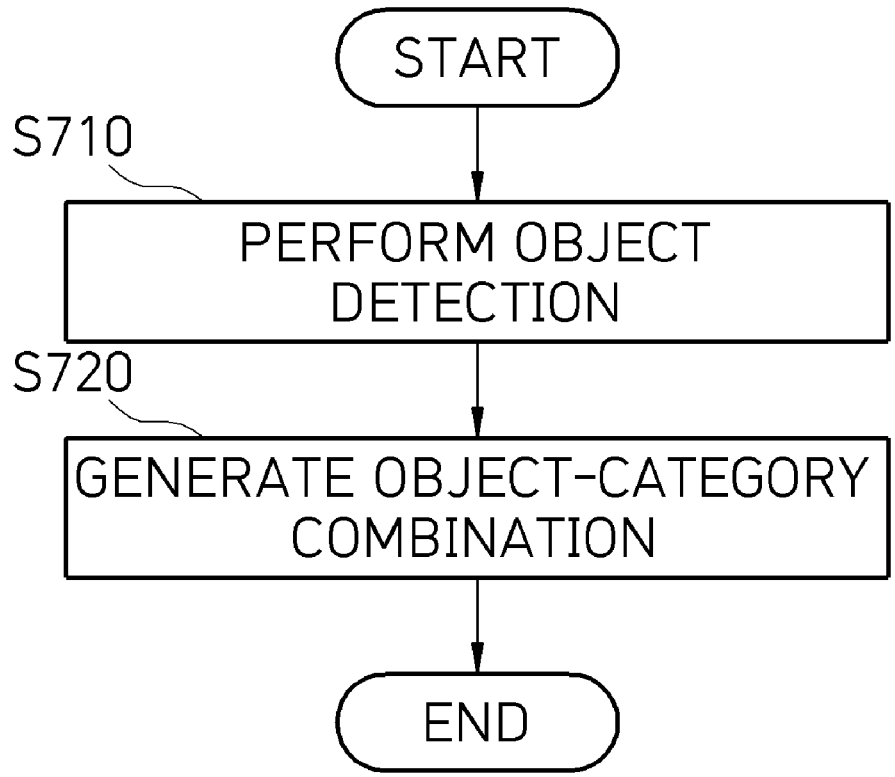
FIG. 7 is a flowchart illustrating operations performed by an image object detection unit of an apparatus for image searching based on AI according to an embodiment of the present invention.

Referring to FIG. 7, the image object detection unit 140 of the apparatus 100 for image searching based on AI according to the embodiment of the present invention performs object detection on the retrieved image acquired by the data collection unit 110 to perform object detection on the result images retrieved by the search engine (S710). Image object detection is performed using the above described AI technology (the object recognition technology), and in this case, the image object detection unit 140 generates an object-category combination which is a combination of an object-category for the objects and direction information (a locational relationship between objects in the retrieved image based on coordinate values) including information about a location and direction between objects in the detected retrieved image, and stores the object-category combination in the form of a linear and/or nonlinear data structure, such as a stack, a queue, and a binary tree (S720).

Figure 8:
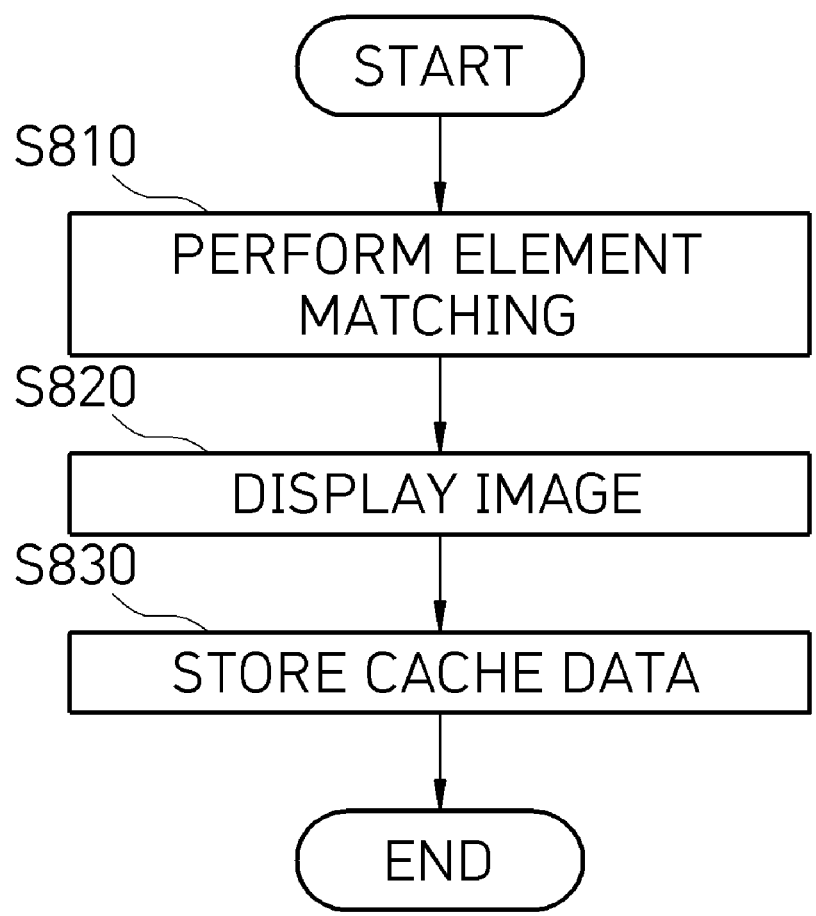
FIG. 8 is a flowchart illustrating operations performed by an element matching and storage unit of an apparatus for image searching based on AI according to an embodiment of the present invention.

Referring to FIG. 8, the element matching and storage unit 150 of the apparatus 100 for image searching based on AI according to the embodiment of the present invention performs matching between each combination element of the keyword-category combination and the object-category combination acquired as the above (S810). In this case, each combination element refers to an object-category and a location of an object stored in each of the keyword-category combination and the object-category combination.

When all the keyword-category combination elements match the object-category combination elements, an image from which the object-category combination is detected is displayed (S820). The degree of matching accuracy between each combination element may be variously set according to the operating environment. For example, whether to allow matching of upper and lower categories of an object-category and the degree of matching of a location in direction information may be variously set. Thereafter, the keyword-category combination and the retrieved information are mapped to each other and stored in the cache data (S830).

Next, a method of image searching using an apparatus for image searching based on AI according to an embodiment of the present invention will be described.

Figure 9:
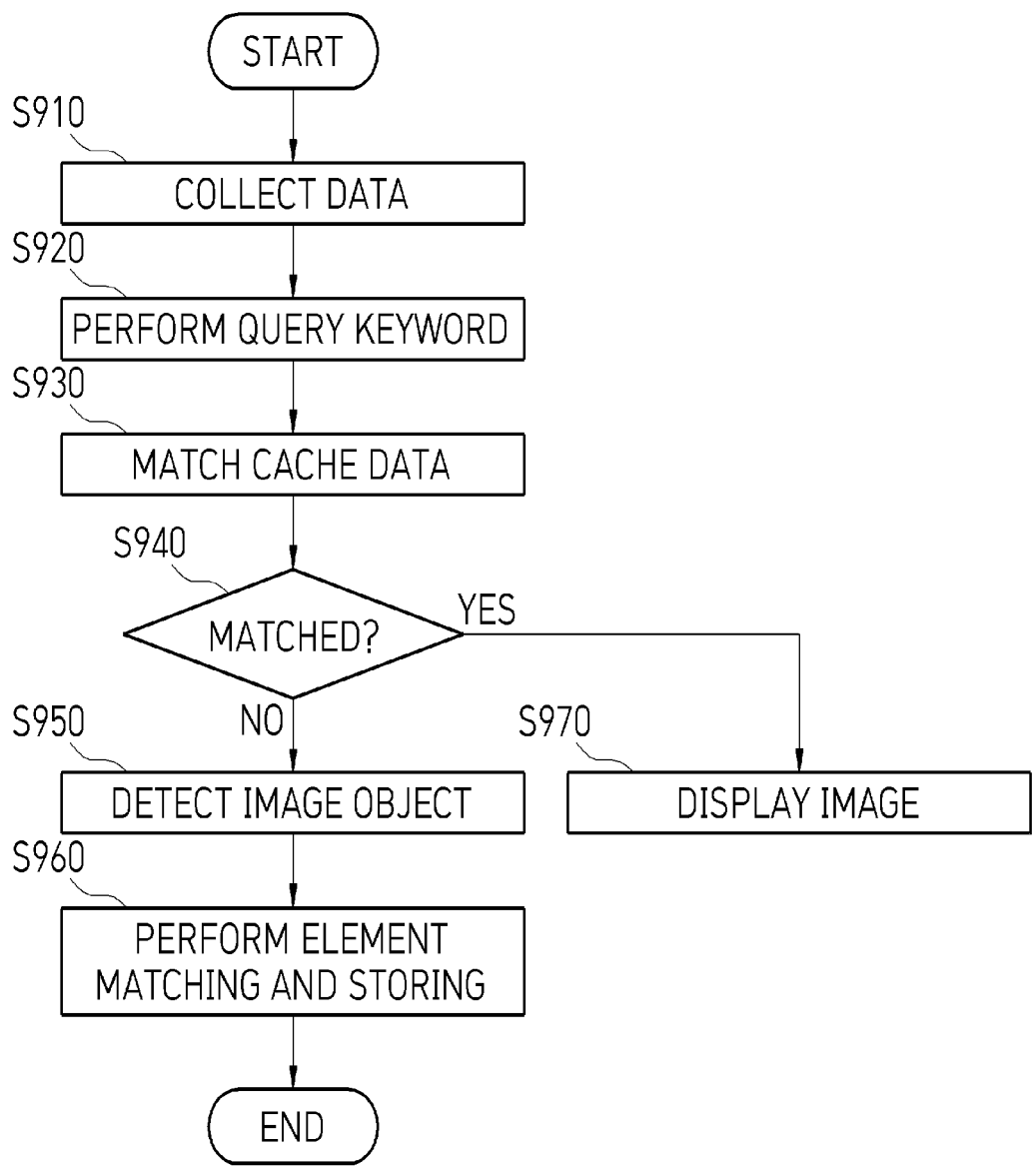
FIG. 9 is a flowchart illustrating a method of image searching using an apparatus for image searching based on AI according to an embodiment of the present invention.

FIG. 9 is a flowchart illustrating a method of image searching using an apparatus for image searching based on AI according to an embodiment of the present invention.

The method of image searching using the apparatus for image searching based on AI according to the embodiment of the present invention shown in FIG. 9 is a method of searching for an image using the apparatus for image searching based on AI according to the embodiment of the present invention shown in FIG. 1.

First, the method includes performing data collection of detecting a user query and retrieved information including a retrieved image and an image address thereof with respect to images found on the basis of search results of an image search engine, and performing pre-processing, such as image address sorting, on the detected user query and the detected retrieved information using image rank information of the image search engine to acquire the preprocessed user query and the pre-processed retrieved information (S910).

Next, the method includes performing, on the basis of the acquired query and pre-constructed object detection target category information, a query keyword detection of detecting a keyword-category combination of the retrieved image corresponding to the object detection target category information (S920). In this case, as described above, different keyword detection processes are performed according to the type of the query (a text-based query, a speech-based query, and an image-based query) acquired in the data collection operation. In particular, as for a text-based user query and a speech-based user query, keywords are detected using a natural language processing technology among AI technologies.

The method includes performing cache data matching of checking whether the keyword-category combination obtained through natural language processing technology performed on pieces of keyword-category combination data detected in the query keyword detection operation matches cache data collected and stored in the cache data storage of the cache data matching unit 130 and corresponding to previous request processing content to detect query cache data matched in the checking, accessing an image address mapped to the matched cache data to acquire an image (S930). In this case, when it is determined that cache data that matches the user query exists (YES in operation S940), the image mapped to the cache data is displayed as a final result (S970), and the image search procedure is terminated by the execution of the process in the cache data matching unit. When it is determined that no cache data matching the user query exists (NO in operation S940), image object detection is performed (S950).

That is, the method includes performing an image object detection operation of performing an object detection process on the image address acquired in the data collection operation to perform object detection on result images retrieved by the search engine. The image object detection operation is performed using the above-described AI technology (the object recognition technology), and in this case, not only the category of objects is detected but also a noun expressing the locational relationship between objects is detected using coordinate values.

The method includes performing an element matching and storing operation of performing matching between each combination element of the acquired keyword-category combination and the acquired object-category combination after the image object detection operation, and when the keyword-category combination elements all match the object-category combination elements, displaying an image from which the object-category combination is detected, and mapping and storing the keyword-category combination and the image address in the cache data (S960). When the above execution process is completed, the image object detection operation S950 and the element matching and storage operation S960 may be repeatedly performed on an image to be searched for.

As described above, the present invention may search for images by combining search engine technology with AI technology (natural language processing and image object detection) so that when a query includes an object that is detectable by an object detection model, only an image from which the object has been detected is finally displayed, and thus high accuracy image searching is provided along with the benefit of the existing search engines. Therefore, the present invention may be applied to various application fields by utilizing various object detection models to search for photos in which a specific entertainer performs a specific action or to search for scenes in which specific characters appear.

Meanwhile, the above-described components have been described as separate devices but are to be regarded as illustrative to aid in the explanation and understanding of the present invention and may be implemented in various forms within the scope and spirit of the present invention. For example, the data collection unit 110 and the query keyword detection unit 120 may be implemented as an integrated module or as two or more separate devices.

Meanwhile, the apparatus and method for image search based on AI according to the embodiment of the present invention may be implemented in a computer system or may be recorded on a recording medium. The computer system may include at least one processor, a memory, a user input device, a data communication bus, a user output device, and a storage. Each of the above-described components performs data communication through the data communication bus.

The computer system may further include a network interface coupled to a network. The processor may be a central processing unit (CPU) or a semiconductor device for processing instructions stored in the memory and/or storage.

The memory and the storage may include various forms of volatile or nonvolatile media. For example, the memory may include a read only memory (ROM) or a random-access memory (RAM).

Accordingly, the method of image searching based on AI according to the embodiment of the present invention may be implemented in a computer-executable form. When the method of image searching based on AI according to the embodiment of the present invention is performed by the computer, instructions readable by the computer may perform the method of image searching based on AI according to the embodiment of the present invention.

The methods according to the present invention may be implemented in the form of program commands executable by various computer devices and may be recorded in a computer readable media. The computer readable media may be provided with program commands, data files, data structures, and the like alone or as a combination thereof. The program commands stored in the computer readable media may be those specially designed and constructed for the purposes of the present invention or may be of the kind well-known and available to those having skill in the computer software arts.

Examples of the computer readable storage medium include a hardware device constructed to store and execute a program command, for example, a ROM, a RAM, and a flash memory. The program command may include a high-level language code executable by a computer through an interpreter in addition to a machine language code made by a compiler. The described hardware devices may be configured to act as one or more software modules in order to perform the operations of the present invention, or vice versa.

As is apparent from the above, in a case of performing an image search on the basis of a user query while an image search engine performs a search on a query requested by a user, a natural language processing analysis result and an object detection analysis result from a user query based on AI technology are compared with an object detection result on retrieved images collected by the image search engine to provide the user with only the matched retrieved image as a final image search result so that the user can be provided with a desired image with a high accuracy.

In addition, the present invention utilizes various object detection models and thus comes into wide use in specific application fields (e.g., searching for a face of a person performing a specific action, a picture of a certain celebrity performing a specific action, a scene in which specific characters appear, etc.) for detecting an image matching an object's action that is a search target.

Although the constructions of the present invention have been described in detail with reference to the embodiments, the above embodiments should be regarded as illustrative rather than limiting in all aspects. A person of ordinary skill in the art should appreciate that various modifications and equivalents derived from the teaching and suggestion of the above specification fall within the scope and sprit of the present invention. Therefore, the scope of the present invention is defined by the appended claims of the present invention.

What is claimed is:

1. A method of image searching based on artificial intelligence (AI), the method comprising:
    acquiring retrieved information, which includes at least one of a retrieved image and an image address, and a user query on the basis of a search result of an image search engine;
    detecting a keyword-category combination on the basis of a type of the acquired user query;
    determining whether cache data that matches the detected keyword-category combination exists;
    generating, in response to absence of the cache data that matches the keyword-category combination, an object-category combination through an AI technology-based object detection on the acquired retrieved information;

performing matching between the acquired keyword-category combination and the object-category combination to, when the acquired keyword-category combination and the object-category combination match each other, display an image from which the object-category combination is detected; and mapping and storing the keyword-category combination and the retrieved information as new cache data, wherein the AI technology includes at least one of a natural language processing technology and an image object recognition technology.

2. The method of claim 1, wherein the detecting of the keyword-category combination includes, when the type of the acquired user inquiry is a text-based inquiry:

determining whether a keyword detected by applying the natural language processing technology to the text-based query is included in object detection target category information defined in advance; and in response to the detected keyword being included in the object detection target category information, detecting the keyword-category combination for the keyword from a keyword-category combination set that is generated in a form of a data structure of a combination of an object-category corresponding to candidate keywords including the keyword and direction information including information about a location and direction of an object.

3. The method of claim 1, wherein the detecting of the keyword-category combination includes, when the type of the acquired user inquiry is a speech-based inquiry:

determining whether a keyword detected by applying the natural language processing technology which includes at least one of morpheme analysis, named entity recognition, and question analysis to a speech recognition execution result from the speech-based query is included in object detection target category information defined in advance; and in response to the detected keyword being included in the object detection target category information, detecting the keyword-category combination for the keyword from a keyword-category combination set that is generated in a form of a data structure of a combination of an object-category corresponding to candidate keywords including the keyword and direction information including information about a location and direction of an object.

4. The method of claim 2, wherein the natural language processing technology includes at least one of morpheme analysis, named entity recognition, and question analysis.

5. The method of claim 4, wherein the morpheme analysis analyzes whether a morpheme detected from the acquired user query belongs to the object detection target category information and whether the morpheme belongs to the direction information in the keyword-category combination set.

6. The method of claim 5, wherein the named entity recognition detects a named entity from the detected morpheme and checks whether the detected named entity is included in the object-category.

7. The method of claim 5, wherein the question analysis, for the morpheme which is detected through the morpheme analysis and the named object recognition but does not belong to the object detection target category, analyzes the user query to understand the meaning of the user query and structure the user query to determine whether the morpheme belongs to the object detection target category.

8. The method of claim 1, wherein the detecting of the keyword-category combination includes, when the type of the acquired user inquiry is an image-based inquiry, generating an object-category combination for the detected retrieved image through an image object detection process.

9. The method of claim 8, wherein the object-category combination is a combination of an object-category regarding at least one object in the retrieved image detected through the image object detection process and belonging to object detection target category information and direction information including information about a location and direction between objects in the detected retrieved image.

10. The method of claim 1, wherein the determining of whether the cache data exists includes:

performing matching between the keyword-category combination generated on the user query and pieces of keyword-category combination data regarding request processing contents collected and stored in advance;

detecting the cache data corresponding to the keyword-category combination data that matches the keyword-category combination;

accessing an image address mapped to the cache data to acquire an image; and displaying the acquired image.

11. The method of claim 1, wherein the generating of the object-category combination includes:

performing object detection on a retrieved image found in the search result of the image search engine;

generating the object-category combination using an object-category belonging to the object detection target category information; and storing the generated object-category combination in a form of a specific data structure.

12. The method of claim 11, wherein the specific data structure includes a data structure corresponding to at least one of a linear data structure and a nonlinear data structure.

13. The method of claim 11, wherein the object-category combination is a combination of an object-category of an object detected through the object detection on the image retrieved by the image search engine and direction information including a location and direction of the object of the retrieved image identified in the retrieved image.

14. An apparatus for image searching based on artificial intelligence (AI), the apparatus comprising:

a data collection unit configured to acquire retrieved information including at least one of a retrieved image and an image address and a user query on the basis of a search result of an image search engine;

a query keyword detection unit configured to detect a keyword-category combination on the basis of a type of the acquired user query;

a cache data matching unit configured to determine whether cache data that matches the detected keyword-category combination exists;

an image object detection unit configured to generate, in response to absence of the cache data that matches the keyword-category combination, an object-category combination through an AI technology-based object detection on the acquired retrieved information; and an element matching and storage unit configured to, when the acquired keyword-category combination and the object-category combination match each other in units of combination elements as a result of combination element matching performed between the acquired keyword-category combination and the object-category combination, display the retrieved image from which the object-category combination is detected, and map and store the keyword-category combination and the image address of the retrieved image as new cache data.

15. The apparatus of claim 14, wherein the AI technology includes at least one of a natural language processing technology that includes at least one of morpheme analysis, named entity recognition, and question analysis, and an image object recognition technology.

16. The apparatus of claim 15, wherein the query keyword detection is configured to:
  when the type of the acquired user inquiry is a text-based inquiry, apply the natural language processing technology to the text-based user query to detect the keyword-category combination;
  when the type of the acquired user inquiry is a speech-based inquiry, apply the natural language processing technology to a result obtained by performing speech recognition on the speech-based query to detect the keyword-category combination; and
  when the type of the acquired user inquiry is an image-based inquiry, detect the object-category combination including an object in the retrieved image and direction information including information about a location and direction of the object of the retrieved image identified in the retrieved image through an image object detection process, and
  wherein the keyword-category combination is a combination of an object-category included in object detection target category information to which a keyword detected from the user query belongs and direction information including information about a location and direction of an object.

* * * * *